(12) United States Patent
Jung

(10) Patent No.: US 9,803,884 B2
(45) Date of Patent: Oct. 31, 2017

(54) HEAT EXCHANGER, HEAT RECOVERY VENTILATOR INCLUDING THE SAME, AND METHOD FOR DEFROSTING AND CHECKING OPERATIONS THEREOF

(71) Applicant: Dong Yang E. & E. Co. Ltd., Yongin-si, Gyeonggi-do (KR)

(72) Inventor: In Sook Jung, Seoul (KR)

(73) Assignee: Dong Yang E. & E. Co. Ltd., Yongin-si (KR)

( * ) Notice: Subject to any disclaimer, the term of this patent is extended or adjusted under 35 U.S.C. 154(b) by 677 days.

(21) Appl. No.: 14/205,523

(22) Filed: Mar. 12, 2014

(65) Prior Publication Data

US 2014/0260362 A1    Sep. 18, 2014

(30) Foreign Application Priority Data

Mar. 14, 2013 (KR) .................. 10-2013-0027412

(51) Int. Cl.
| F28F 1/00 | (2006.01) |
| F28D 9/00 | (2006.01) |
| F24F 12/00 | (2006.01) |
| F28F 3/02 | (2006.01) |
| F24F 11/00 | (2006.01) |

(52) U.S. Cl.
CPC .......... F24F 12/006 (2013.01); F28D 9/0031 (2013.01); F28D 9/0062 (2013.01); F28D 9/0081 (2013.01); F28F 3/025 (2013.01); F24F 2011/0087 (2013.01); Y02B 30/563 (2013.01); Y10T 29/4935 (2015.01)

(58) Field of Classification Search
CPC ...... F28F 3/025; F28D 9/0062; F28D 9/0081; F28D 9/0031; Y02B 30/563

USPC ........................................ 165/166; 29/890.03
See application file for complete search history.

(56) References Cited

U.S. PATENT DOCUMENTS

| 2,959,401 A * | 11/1960 | Burton ................. F28D 9/0037 165/166 |
| 3,176,763 A * | 4/1965 | Frohlich ............... F28D 9/0062 165/166 |
| 4,460,388 A * | 7/1984 | Fukami .................. F24F 13/30 165/166 |
| 4,503,905 A * | 3/1985 | Newman ................. F28F 21/04 165/166 |
| 4,589,983 A * | 5/1986 | Wydevan ............... B01D 25/24 210/317 |

(Continued)

FOREIGN PATENT DOCUMENTS

| JP | 2002-372391 | 12/2002 |
| JP | 2003-262487 | 9/2003 |

(Continued)

OTHER PUBLICATIONS

Notice of Decision of Granting Patent Dated Jun. 27, 2014 From the Korean Intellectual Property Office Re. Application No. 10-2013-0027412 and Its Translation Into English.

(Continued)

Primary Examiner — Jianying Atkisson
Assistant Examiner — Kun Kai Ma

(57) ABSTRACT

The present invention relates to a heat exchanger, a method for manufacturing the same, a heat recovery ventilator (HRV) including the same, and a method for defrosting and checking operations thereof.

2 Claims, 15 Drawing Sheets

(56) References Cited

U.S. PATENT DOCUMENTS

| | | | | |
|---|---|---|---|---|
| 4,596,285 A * | 6/1986 | Dinulescu | F28F 3/083 | 165/166 |
| 4,616,695 A * | 10/1986 | Takahashi | F28D 9/0068 | 165/166 |
| 4,789,585 A * | 12/1988 | Saito | F28F 21/04 | 165/134.1 |
| 4,907,648 A * | 3/1990 | Emmerich | F28D 9/0062 | 165/165 |
| 5,002,118 A | 3/1991 | Olmstead et al. | | |
| 5,193,610 A | 3/1993 | Morissette et al. | | |
| 5,205,037 A * | 4/1993 | Kuriki | B23P 15/26 | 165/166 |
| 5,303,771 A * | 4/1994 | Des Champs | F28D 9/0025 | 165/165 |
| 5,626,188 A * | 5/1997 | Dewar | F28D 9/0037 | 165/166 |
| 5,632,334 A | 5/1997 | Grinbergs et al. | | |
| 6,019,170 A * | 2/2000 | Yokoya | F28D 9/0062 | 165/166 |
| 6,032,730 A * | 3/2000 | Akita | F24F 12/006 | 165/157 |
| 6,145,588 A * | 11/2000 | Martin | F24F 3/147 | 165/133 |
| 6,634,419 B1 * | 10/2003 | Beldam | F02B 29/0462 | 165/146 |
| 7,124,812 B1 * | 10/2006 | Agee | F28D 9/0037 | 165/146 |
| 7,237,603 B2 * | 7/2007 | Shin | F28D 9/0037 | 165/164 |
| 7,329,326 B2 * | 2/2008 | Wagner | B01D 25/001 | 156/205 |
| 7,331,376 B2 * | 2/2008 | Gagnon | F24F 12/006 | 165/166 |
| 7,490,580 B2 * | 2/2009 | Hanai | B01B 1/005 | 122/31.1 |
| 8,327,924 B2 * | 12/2012 | Muley | F28F 3/02 | 165/135 |
| 8,439,103 B2 * | 5/2013 | Reinders | F28D 9/0062 | 165/165 |
| 8,590,606 B2 * | 11/2013 | Arai | F24F 12/006 | 165/166 |
| 2001/0054500 A1 * | 12/2001 | Raybould | C23C 26/00 | 165/166 |
| 2002/0185266 A1 * | 12/2002 | Dobbs | F24F 3/147 | 165/166 |
| 2003/0075308 A1 * | 4/2003 | Abiko | F28D 9/0068 | 165/148 |
| 2003/0094269 A1 * | 5/2003 | Arai | F24F 3/147 | 165/166 |
| 2005/0252647 A1 * | 11/2005 | Lee | F24F 12/006 | 165/166 |
| 2006/0054309 A1 * | 3/2006 | Lee | F24F 12/006 | 165/109.1 |
| 2006/0096746 A1 * | 5/2006 | Arpin | F24F 13/30 | 165/166 |
| 2006/0260790 A1 * | 11/2006 | Theno | F24F 12/006 | 165/166 |
| 2008/0017362 A1 * | 1/2008 | Kwon | F24F 12/006 | 165/166 |
| 2010/0139901 A1 * | 6/2010 | Takada | F24F 3/147 | 165/166 |
| 2010/0263823 A1 * | 10/2010 | Mitsuhashi | F28D 9/0062 | 165/11.1 |
| 2012/0043064 A1 * | 2/2012 | Takada | F28D 9/0062 | 165/166 |

FOREIGN PATENT DOCUMENTS

| | | |
|---|---|---|
| KR | 10-2005-0035920 | 4/2005 |
| KR | 10-0667230 | 1/2007 |
| KR | 10-2008-0027921 | 3/2008 |
| KR | 10-1013727 | 2/2011 |
| KR | 10-2013-0027412 | 3/2013 |

OTHER PUBLICATIONS

Notice of Preliminary Rejection dated Feb. 20, 2014 From the Korean Intellectual Property Office Re. Application No. 10-2013-0027412 and Its Translation Into English.

* cited by examiner

NORMAL OPERATION     DEFROSTING OPERATION

NORMAL OPERATION     DEFROSTING OPERATION

NORMAL OPERATION          DEFROSTING OPERATION (a)   (b)

NORMAL OPERATION    DEFROSTING OPERATION

NORMAL OPERATION    DEFROSTING OPERATION

NORMAL OPERATION        DEFROSTING OPERATION

NORMAL OPERATION        DEFROSTING OPERATION

HEAT EXCHANGER, HEAT RECOVERY VENTILATOR INCLUDING THE SAME, AND METHOD FOR DEFROSTING AND CHECKING OPERATIONS THEREOF

RELATED APPLICATION

This application claims the benefit of priority of Korean Patent Application No. 10-2013-0027412 filed Mar. 14, 2013, the contents of which are incorporated herein by reference in their entirety.

TECHNICAL FIELD

The present invention relates to a heat exchanger, a method for manufacturing the same, a heat recovery ventilator (HRV) including the same, and a method for defrosting and checking operations thereof.

BACKGROUND ART

FIG. 1 illustrates a general heat recovery ventilator (HRV) 10. The heat recovery ventilator 10 includes a heat exchanger 11, a supplied air fan 12, an exhaust air fan 13, an outdoor air introduction chamber 14, a supplied air discharge chamber 15, a return air introduction chamber 16, and an exhaust air discharge chamber 17. The heat exchanger 11 performs heat exchange between supplied air stream 20 supplied to the interior Y from the exterior X and exhaust air stream 30 discharged from the interior Y to the exterior X.

The supplied air stream 20 supplied to the interior from the exterior is an air stream which is introduced as outdoor air (OA) 21 into the outdoor air introduction chamber 14, passes through an air filter, exchanges heat with the exhaust air stream 30 while passing through a supplied air flow path of the heat exchanger 11, and is supplied as supplied air (SA) 24 to the interior Y through the supply air discharge chamber 15 and the supplied air fan 12. The return air (RA) 31 of the exhaust air stream 30 discharged from the interior to the exterior is an air stream which, having been introduced into the return air introduction chamber 16, passes through an air filter, exchanges heat with the supplied air stream 20 while passing through an exhaust air flow path of the heat exchanger 11, and is discharged as exhaust air (EA) 34 to the exterior X through the exhaust air discharge chamber 17 and the exhaust air fan 13.

In the winter season, the temperature of the return air (RA) 31 is higher than that of the outdoor air (OA) 21. Thus, when heat exchange is performed by the heat exchanger 11, energy is transmitted from the exhaust air stream 30 to the supplied air stream 20. Therefore, the exhaust air (EA) 34 having passed through the heat exchanger 11 has a lower temperature than the return air (RA) 31, and the supplied air (SA) 24 having passed through the heat exchanger 11 has a higher temperature than the outdoor air (OA) 21. In the summer season, energy is transmitted in the opposite manner.

At this time, the heat exchanger 11 includes the supplied air flow path and the exhaust air flow path which are separated from each other with a heat exchange surface 1 provided therebetween (refer to FIGS. 2, 3, and 4), so the two air flows 20 and 30 exchange energy without mixing. A heat exchanger which performs only sensible heat (temperature) exchange is referred to as a heat exchanger, and a heat exchanger which performs latent heat (humidity) exchange as well as sensible heat exchange is referred to as a total heat exchanger. The sensible heat exchanger has a heat exchange surface formed of aluminum or plastic, and the total heat exchanger has a heat exchange surface formed of a hydrophilic organic polymer thin film.

FIG. 2 illustrates a two-way multi-flow-path heat exchanger which includes a plurality of heat exchange elements 41 stacked therein. The plurality of heat exchange elements 41, each of which is manufactured by attaching a corrugated flow path formation member 42 on the heat exchange surface 1, are stacked in such a manner that the directions thereof are alternately turned by 90 degrees in order to form a plurality of parallel flow paths in each of a supplied air flow path and an exhaust air flow path. The two-way multi-flow-path heat exchanger has a disadvantage in that it is manufactured through a complex manufacturing process.

FIG. 3 illustrates a two-way single-flow-path heat exchanger which includes a plurality of heat exchange elements 51 stacked therein. The plurality of heat exchange elements 51, each of which has a plurality of spacer protrusions 52 formed on the heat exchange surface 1, are stacked in such a manner that the directions thereof are alternately turned. The two-way single-flow-path heat exchanger of FIG. 3 may be manufactured through a simple process, but has a disadvantage in that expensive metallic material such as aluminum must be used.

FIG. 4 illustrates a heat exchanger having a simpler manufacturing process than the heat exchanger of FIG. 2, using a cheaper material such as a plastic material, which has been disclosed in Korean Patent Laid-open Publication No. 10-2008-0027921. The heat exchanger of FIG. 4 is a two-way single-flow-path heat exchanger 60 which includes a plurality of heat exchange elements 61 stacked therein. The plurality of heat exchange elements 61, each of which has a plurality of parallel flow paths and is formed by extrusion-molding a plastic material, are stacked in such a manner that the directions thereof are alternately turned by 90 degrees. The heat exchanger has a structure in which two heat exchange surfaces 1 are integrated with each other between a flow path formation member 62 and another flow path formation member 62. Thus, when the flow path formation members 61 are alternately stacked to manufacture the heat exchanger, two heat exchange surfaces 1 are contacted with each other. When an air layer is formed on the heat exchange surfaces, heat exchange efficiency is considerably degraded. Thus, when the heat exchange elements 61 are stacked, an adhesive must be applied to remove an air layer on the heat exchange surface 1. Although the manufacturing process is relatively simple, the process of applying an adhesive must be performed. Furthermore, the volume of the heat exchanger is increased.

In order to continuously maintain heat exchange efficiency and ventilation efficiency of a heat recovery ventilator, it is important to prevent flow paths from being clogged with foreign matters such as dust. Furthermore, when flow path blockage occurs, the flow path blockage must be immediately recognized and removed.

When the exhaust air flow path is partially blocked in a state where the supplied air flow path is normal, the exhaust air amount and the heat exchange area are decreased. In such a state, the heat exchange efficiency of the heat recovery ventilator may be decreased so that the temperature of the supplied air becomes lower than in a normal state. Although the amount of supplied air is larger than the amount of exhaust air, return air is discharged through interior gaps. Thus, the ventilation efficiency is not significantly degraded, but the heat efficiency is degraded.

When the supplied air flow path is partially blocked in a state where the exhaust air flow path is normal, the supplied air amount and the heat exchange area are decreased. In such a state, the heat exchange efficiency of the heat recovery ventilator is degraded depending on the shape of flow path blockage. However, since the amount of exhaust air is larger than the amount of supplied air, outdoor air is supplied to the interior through interior gaps. Thus, although the ventilation efficiency is not considerably degraded, the entire heat exchange efficiency is further degraded because there exists the air which is supplied to the interior without passing through the heat recovery ventilator.

When both of the exhaust air flow path and the supplied air flow path are partially blocked, the exhaust air amount, the supplied air amount, and the heat exchange area are reduced. In such a state, the heat exchange efficiency of the heat recovery ventilator is degraded depending on the shape of flow path blockage.

Except for dust, main factors which block the flow paths of the heat exchanger may include ice which is formed in the exhaust air flow path in the winter season and snow which is introduced into the outdoor air introduction chamber along outdoor air so as to block the supplied air flow path, while it snows outside below zero.

When the heat recovery ventilator is used in the winter season, the exhaust air discharged from the interior to the exterior has higher temperature and humidity than the air supplied to the interior from the exterior. When heat exchange between the exhaust air and the supplied air is performed by the heat exchanger in the winter season, the temperature of outdoor air (OA) of the supplied air stream increases, and the outdoor air becomes supplied air (SA) to be supplied to the interior. Furthermore, the temperature of return air (RA) of the exhaust air stream decreases, and the return air becomes exhaust air (EA) to be discharged to the exterior. In this case, when the temperature of the exhaust air decreases below dew point, condensed water occurs. When the temperature of the outdoor air decreases below zero, a part of the condensed water may be frozen. Then, since the exhaust air cannot pass through the frozen part, the heat exchange surface corresponding to the frozen part may lose the function thereof.

Table 1 shows ice formation area ratios, ice formation width ratios, and available heat exchange area ratios of the two-way multi-flow-path heat exchanger (FIGS. 2 and 4) and the two-way single-flow-path heat exchanger (FIG. 3), when the return air (RA) has a temperature of 26° C. and a relative humidity of 60% in the high-efficiency heat exchanger. Table 2 shows ice formation area ratios, ice formation width ratios, and available heat exchange area ratios of low-efficiency heat exchangers. FIG. 5 is a plan view illustrating the shape of ice formation in the heat exchange element, and the ice formation width ratio indicates the ratio (D/W) of ice formation (D) to width (W) of the exhaust air flow path.

Referring to Tables 1 and 2, ice formation in the low-efficiency heat exchangers occurs at a lower outdoor air temperature than in the high-efficiency heat exchangers, under the same interior temperature and humidity condition. Thus, there is a demand for the development of a high-efficiency heat exchanger wherein the outdoor air temperature in which ice formation starts to occur is lower.

In Table 1, the ice formation area ratios of the multi-flow-path heat exchanger and the single-flow-path heat exchanger are equal to each other at each outdoor temperature, but the available heat exchange area ratio of the single-flow-path heat exchanger is much larger than that of the multi-flow-path heat exchanger. In the multi-flow-path heat exchanger, although each flow path is partially blocked, air cannot pass through the entire part of the blocked flow path. For this reason, the single-flow-path heat exchanger may be more effectively used in an area where ice formation frequently occurs in the winter season.

However, when the single-flow-path heat exchanger is used in a place, such as a cattle shed, where a large quantity of foreign matters such as dust is contained in indoor air, the foreign matters may be easily accumulated on the spacer protrusions 52 (refer to FIG. 3).

TABLE 1

| Outdoor air temperature (° C.) | Multi-flow-path heat exchanger | | | Single-flow-path heat exchanger | | |
|---|---|---|---|---|---|---|
| | Ice formation area (%) | Ice formation width (%) | Available heat exchange area | Ice formation area (%) | Ice formation width (%) | Available heat exchange area |
| −2 | 0.0 | 0.0 | 100.0 | 0.0 | 0.0 | 100.0 |
| −4 | 0.2 | 3.0 | 97.0 | 0.2 | 3.0 | 99.8 |
| −6 | 1.8 | 10.0 | 90.0 | 1.8 | 10.0 | 98.2 |
| −8 | 3.5 | 15.5 | 84.5 | 3.5 | 15.5 | 96.5 |
| −10 | 7.0 | 22.5 | 77.5 | 7.0 | 22.5 | 93.0 |
| −12 | 9.9 | 28.0 | 72.0 | 9.9 | 28.0 | 90.1 |

TABLE 2

| Outdoor air temperature (° C.) | Multi-flow-path heat exchanger | | | Single-flow-path heat exchanger | | |
|---|---|---|---|---|---|---|
| | Ice formation area (%) | Ice formation width (%) | Available heat exchange area | Ice formation area (%) | Ice formation width (%) | Available heat exchange area |
| −2 | 0.0 | 0.0 | 100.0 | 0.0 | 0.0 | 100.0 |
| −4 | 0.0 | 0.0 | 100.0 | 0.0 | 0.0 | 100.0 |

TABLE 2-continued

|  | Multi-flow-path heat exchanger | | | Single-flow-path heat exchanger | | |
| --- | --- | --- | --- | --- | --- | --- |
| Outdoor air temperature (° C.) | Ice formation area (%) | Ice formation width (%) | Available heat exchange area | Ice formation area (%) | Ice formation width (%) | Available heat exchange area |
| −6 | 0.0 | 0.0 | 100.0 | 0.0 | 0.0 | 100.0 |
| −8 | 0.0 | 0.0 | 100.0 | 0.0 | 0.0 | 100.0 |
| −10 | 0.3 | 4.5 | 95.5 | 0.32 | 4.5 | 99.7 |
| −12 | 2.4 | 13.0 | 87.0 | 2.4 | 13.0 | 97.6 |

When blockage is caused by dust, the blockage must be removed by a manager. However, when blockage is caused by ice formation, energy for defrosting may be provided to remove the blockage. Therefore, various methods have been proposed.

For example, when an electric heater is installed in the exhaust air introduction chamber so as to maintain the outdoor air temperature at a higher temperature than the temperature at which ice formation occurs, the ice formation problem may be simply solved. However, since additional electric energy is needed, this method is not effective.

FIG. 6 illustrates a method disclosed in U.S. Pat. No. 5,002,118. The method includes a flow selection damper 101 installed in an exhaust gas introduction chamber, and uses two heat exchangers. During a frosting operation, the flow path selection damper 101 is operated to block outdoor air 22, and return air 132 is introduced into the exhaust air introduction chamber. The temperature of the return air 132 decreases while the return air 132 passes through a supplied air flow path of the heat exchanger and defrosts ice of the exhaust air flow path. Then, as the return air 132 receives energy from exhaust air 32 and 33, the temperature of the return air 132 increases, and the return air 132 is supplied to the interior again (re-supplied return air 132). According to this method, the return air 32 is discharged to the exterior, but the outdoor air is not introduced to the interior through a heat recovery ventilator but introduced to the interior through other paths such as gaps of the outer wall. Thus, the outdoor air may be introduced to the interior through a contaminated path such as a discharge flow path of a kitchen hood. Furthermore, when this method is used in a place where the relative humidity of indoor air is high, condensed water may be generated from the return air 132 during a defrosting operation. Then, the condensed water may remain in the supplied air flow path of the heat exchanger, and may be frozen by the cold outdoor air 22 during a normal operation after the defrosting operation is completed. In this case, the frozen water may block the supplied air flow path of the heat exchanger. Furthermore, when this method is used in a place where indoor air is significantly contaminated by dust or the like, the supplied air flow path may be contaminated.

FIG. 7 illustrates a method disclosed in U.S. Pat. No. 5,193,610. The method includes a flow path selection damper 101 and a flow path selection damper 102. The flow path selection damper 101 is installed at an outdoor air introduction chamber so as to select the introduction of return air or outdoor air, and the flow path selection damper 102 is installed at an exhaust air outlet so as to select the discharge direction of exhaust air to the interior or exterior. During a defrosting operation, the flow path selection damper 101 blocks the supply of supplied air and introduces a part of the return air into the exhaust air introduction chamber, and the flow path selection damper 102 blocks the leakage of exhaust air to the exterior and re-introduces the exhaust air to the interior. This method can solve the problem that air is introduced through a contaminated path such as a discharge flow path of a kitchen hood. However, since ventilation is stopped during the defrosting operation, the ventilation efficiency may be degraded, and the supplied air flow path may be frozen or contaminated.

FIG. 8 is a method disclosed in U.S. Pat. No. 5,632,334. The method uses a flow path selection damper 103 which is installed in an exhaust gas outlet so as to selectively discharge exhaust air to the interior or an outdoor air introduction chamber. The method has an advantage in that it uses only one flow selection damper, but still has the problem described with reference to FIG. 7.

U.S. Pat. No. 5,632,334 has also proposed a new frosting method. According to the frosting method, a temperature sensor is installed in the outdoor air introduction chamber, a frosting operation is started when the outdoor air temperature is equal to or lower than a preset temperature, and a normal operation is performed when the outdoor air temperature is higher than the preset temperature. However, the temperature and humidity of indoor air are continuously changed while the system is used. Thus, when an ice formation state is determined only through the outdoor air temperature, an unnecessary defrosting operation may be performed, or the defrosting operation may be performed after a considerable amount of ice is formed.

Korean Patent No. 10-0565831 has disclosed a method which determines whether to perform a checking operation or whether an abnormality occurs, when an exhaust air flow path or supplied air flow path of a heat exchanger is clogged with foreign matters such as dust or ice. The method includes a first pressure sensor and a second pressure sensor. The first pressure sensor is installed in an exhaust air discharge chamber so as to measure the pressure of exhaust air stream, and the second pressure sensor is installed in a return air introduction chamber. The pressures measured by the respective pressure sensors are used to check a flow path of the exhaust air stream. This method requires expensive pressure sensors, and the temperature ratio of two temperature sensors is changed according to the outdoor temperature at the same heat exchange efficiency, and changed according to the heat exchange efficiency of the heat exchanger at the same outdoor temperature. Thus, it is difficult to accurately determine blockage caused by dust or ice formation.

Patent Document 1: KR 10-2008-002792 A

Patent Document 2: U.S. Pat. No. 5,002,118 B

Patent Document 3: U.S. Pat. No. 5,193,610 B

Patent Document 4: U.S. Pat. No. 5,632,334 B

Patent Document 5: KR 10-0565831 B

DISCLOSURE

Technical Problem

The problems of the above-described heat recovery ventilators and the heat exchangers used in the heat recovery ventilators may be summarized as follows:

1. Since the manufacturing processes of the heat exchangers are complex or an expensive material such as aluminum is used, a high manufacturing cost is required;
2. Ice formation starts to exist in high-efficiency heat exchangers at a comparatively high outdoor temperature. Therefore, this is an obstacle to utilizing current high-efficiency heat exchangers;
3. The multi-flow-path heat exchanger has the ice formation area ratio higher than the ratio of a heat exchange surface which cannot be used;
4. The single-flow-path heat exchanger has the same ice formation area ratio as the ratio of the heat exchange surface which cannot be used. However, the single-flow-path heat exchanger is relatively expensive, and the spacer protrusions may be clogged with dust or the like;
5. When ice is formed in the exhaust air flow path of the heat exchanger of the heat recovery ventilator, a defrosting operation is performed by passing return air through the supplied air flow path of the heat exchanger. However, such a method contaminates and frosts the supplied air flow path, and degrades the ventilation efficiency;
6. When an expensive pressure sensor or temperature sensor is used to detect an ice formation state of the heat recovery ventilator, only the temperature of outdoor air or only the temperature of return air or supplied air is checked. Therefore, it is difficult to accurately determine the ice formation state; and
7. When the supplied air flow path of the heat recovery ventilator is clogged with dust or snow, an expensive pressure sensor must be used.

Technical Solution

In an embodiment, a heat exchanger may include: a plurality of stacked heat exchange elements; insulation support plates attached to the top and bottom surfaces of the stacked heat exchange elements; and connection members attached to the respective corners of the stacked heat exchange elements. Each of the heat exchange elements may include: a multi-flow-path divided through a heat exchange surface spacer member; and a pair of heat exchange element spacer members installed over both ends of the multi-flow-path, in a direction perpendicular to a flow path direction of the multi-flow-path structure, and a single-flow-path may be formed through the heat exchange element spacer members.

In another embodiment, a method for manufacturing a heat exchanger may include: (a) extrusion-molding a plastic corrugated cardboard; (b) closing both ends of the extrusion-molded plastic corrugated cardboard in a direction perpendicular to a corrugation direction of the plastic corrugated cardboard; (c) cutting the plastic corrugated cardboard, of which both ends are closed, along cutting lines spaced from the closed portions; (d) bending the cut portions by 180 degrees, thereby forming a heat exchange element; and (f) stacking a plurality of heat exchange elements formed through the steps (a) to (d) such that a multi-flow-path is formed in the plastic corrugated cardboard and a single-flow-path is formed between the respective stacked heat exchange elements.

In another embodiment, a method for manufacturing a heat exchanger may include: (a) extrusion-molding a plastic corrugated cardboard; (b) attaching foamed plastic onto both ends of the extrusion-molded plastic corrugated cardboard in a direction perpendicular to a corrugation direction of the plastic corrugated cardboard; and (c) stacking a plurality of heat exchange elements formed through the steps (a) and (b) such that a multi-flow-path is formed in the plastic corrugated cardboard and a single-flow-path is formed between the respective stacked heat exchange elements.

In another embodiment, a heat recovery ventilator may include: a heat exchanger; an outdoor air introduction chamber having an outdoor air inlet through which outdoor air is introduced; a supplied air discharge chamber having a supplied air outlet through which the outdoor air introduced into the outdoor air introduction chamber is supplied to the interior through the heat exchanger; a return air introduction chamber into which return air is introduced; an exhaust air discharge chamber through which the return air introduced into the return air introduction chamber is discharged to the exterior, after the return air exchanges heat with the outdoor air while passing through the heat exchanger; a first connection path connecting the exhaust air introduction chamber and the supplied air discharge chamber; and a first flow path selection damper positioned on the first connection path so as to select a first position at which outdoor air is introduced into the outdoor air introduction chamber or a second position at which the air of the supplied air discharge chamber is introduced into the first connection path and then circulated such that outdoor air is introduced into the outdoor air introduction chamber.

A double heat exchanger according to an embodiment of the present invention may be applied to the present embodiment.

In another embodiment, a method for defrosting and checking operations of a heat recovery ventilator may include: (a) calculating temperature exchange efficiency $\eta$ using return air temperature $T_{RA}$, supplied air temperature $T_{SA}$, and outdoor air temperature $T_{OA}$ based on the heat recovery ventilator; (b) determining that flow path blockage occurred, when the temperature exchange efficiency $\eta$ is lower than preset reference efficiency $\eta_S$; (c) issuing an alarm and performing a checking operation, when it is determined that flow path blockage occurred and when the outdoor air temperature $T_{OA}$ is higher than preset ice formation reference temperature $T_S$; (d) issuing an alarm and performing a checking operation, when it is determined that flow path blockage occurred and when the outdoor air temperature $T_{OA}$ is lower than the preset ice formation reference temperature $T_S$ and a normal operation accumulating time RT of the heat exchange ventilator is smaller than a preset reference time $RT_S$; and (e) performing a defrosting operation when it is determined that flow path blockage occurred and when the outdoor air temperature $T_{OA}$ is lower than the preset ice formation reference temperature $T_S$ and the normal operation accumulating time RT of the heat exchange ventilator is larger than the preset reference time $RT_S$.

In another embodiment, a method for defrosting and checking operations of a heat recovery ventilator may include: (a) performing a defrosting operation when an exhaust air fan current $I_{EA}$ of the heat recovery ventilator is smaller than a preset normal operation exhaust air fan reference current $I_{SEA}$ or a supplied air fan current $I_{SA}$ is smaller than a preset normal operation supplied air fan reference current $I_{SSA}$; (b) stopping the defrosting operation and performing a normal operation when the exhaust air fan current $I_{EA}$ is larger than a preset defrosting operation exhaust air fan reference current $I_{DEA}$ or a supplied air fan current $I_{SA}$ is larger than a preset defrosting operation supplied air fan reference current $I_{DSA}$, while the defrosting operation is performed according to the step (a); and (c) issuing an alarm and performing a checking operation, when a defrosting operation time DT during which the defrosting operation is performed according to the step (a) is larger than a preset time limit $DT_S$.

In another embodiment, a method for defrosting and checking operations of a heat recovery ventilator may include: (a) calculating temperature exchange efficiency η using return air temperature $T_{RA}$, supplied air temperature $T_{SA}$, and outdoor air temperature $T_{OA}$ based on the heat recovery ventilator; (b) determining that flow path blockage occurred, when the temperature exchange efficiency η is lower than preset reference efficiency $η_S$ and when an exhaust air fan current $I_{SEA}$ of the heat recovery ventilator is smaller than a preset normal operation exhaust air fan reference current $I_{SEA}$ or a supplied air fan current $I_{OA}$ is smaller than a preset normal operation supplied air fan reference current (c) performing a defrosting operation, when it is determined that flow path blockage occurred and when the outdoor air temperature $T_{OA}$ is higher than preset ice formation reference temperature $T_S$; (d) stopping the defrosting operation and performing a normal operation, when the exhaust air fan current $I_{EA}$ is larger than a preset defrosting operation exhaust air fan reference current $I_{DEA}$ or a supplied air fan current $I_{SA}$ is larger than a preset defrosting operation supplied air fan reference current $I_{DSA}$, while the defrosting operation is performed according to the step (c); and (e) issuing an alarm and performing a checking operation, when a defrosting operation time DT during which the defrosting operation is performed according to the step (a) is larger than a preset time limit $DT_S$.

Advantageous Effects

According to the embodiments of the present invention, the heat exchanger has a simple manufacturing process, and may be manufactured at a low manufacturing cost because an expensive material such as aluminum is not used. Furthermore, the outdoor air temperature at which ice formation starts to occur may be lowered, thereby reducing the number of factors which cause trouble.

Furthermore, since the heat exchanger having a multi-flow-path structure and a single-flow-path structure is used, the ratio of ice formation area and unavailable heat exchange area is lower than in the conventional heat exchanger.

Furthermore, in the conventional single-flow-path heat exchanger, dust may be accumulated on the spacer protrusions. However, such a problem does not occur in the heat exchanger according to the embodiment of the present invention.

Furthermore, when ice formation occurs in the flow path for the exhaust air stream in the heat exchanger, air for defrosting is re-circulated inside the heat recovery ventilator. Thus, the heat recovery ventilator may solve the problem that the flow path for supplied air stream is contaminated and the ventilation efficiency decreases.

Furthermore, the ice formation state of the heat recovery ventilator may be detected without using an expensive pressure sensor.

Furthermore, the heat recovery ventilator may accurately determine an ice formation state by complementing the conventional method in which the temperature sensor is used to detect only the temperature of outdoor air or the temperature of return air or supplied.

DESCRIPTION OF DRAWINGS

FIGS. 2 and 4 illustrate multi-flow-path heat exchangers.

FIG. 3 illustrates a single-flow-path heat exchanger.

FIG. 12 illustrates the heat exchanger manufactured through stacking the heat exchange elements of FIGS. 11A-11B.

FIG. 18 illustrates a method in which three temperature sensors are used.

FIG. 19 illustrates a method in which two hole sensors are used.

FIG. 20 illustrates a method in which three temperature sensors and two hole sensors are used.

BEST MODE FOR THE INVENTION

Figure 10:
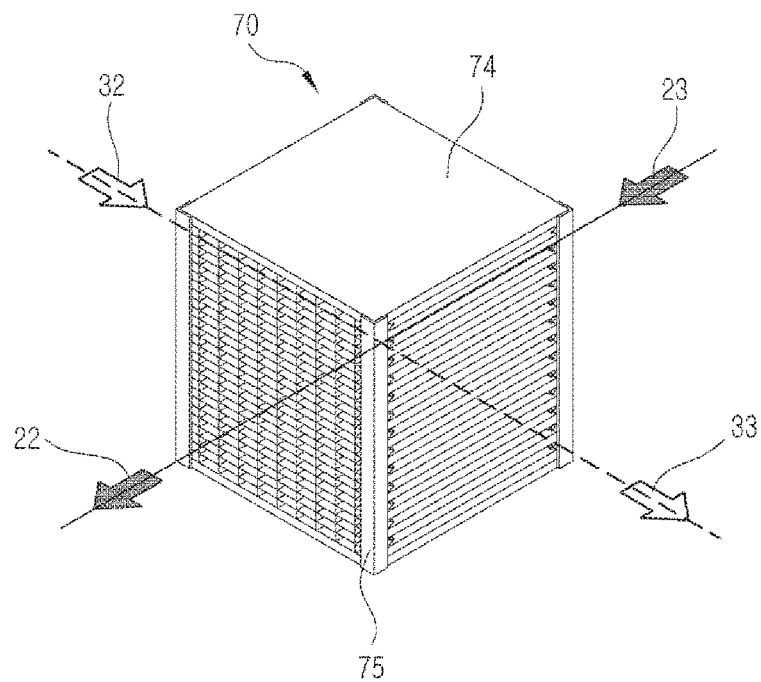
Figure 11:
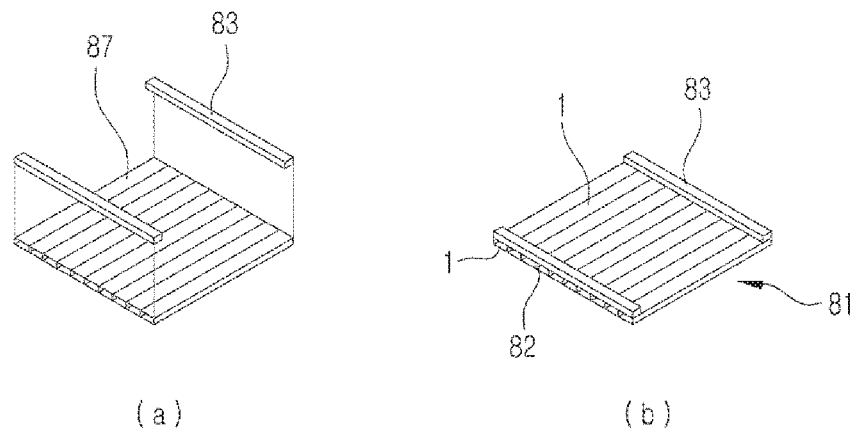
FIGS. 11A-11B and 12 illustrate a process for manufacturing a heat exchange element used in a heat exchanger according to a second embodiment of the present invention and the heat exchanger manufactured through the manufactured process.
Figure 12:
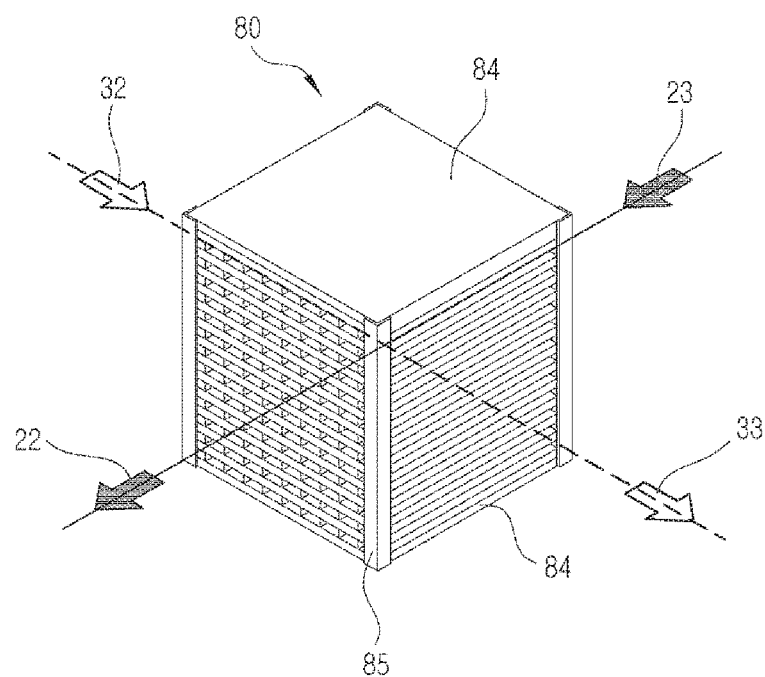

Descriptions for Heat Exchanger Including Both of Multi-Flow-Path Structure and Single-Flow-Path Structure Referring to FIGS. 9A-9D and 10, a heat exchanger according to a first embodiment of the present invention will be described. Referring to FIGS. 11A-11B and 12, a heat exchanger according to a second embodiment of the present invention will be described. Furthermore, a double heat exchanger according to a third embodiment of the present invention, to which the first and second embodiments may be applied, will be described with reference to FIG. 13.

In order to solve problems of a heat exchanger, an exhaust air flow path of a heat exchange element must have a single-flow-path structure, and spacer protrusions which disturb an air flow and on which foreign matters such as dust are accumulated must be removed.

The embodiments of the present invention provide a heat exchanger which includes both of a single-flow-path structure and a multi-flow-path structure, in order to satisfy such a condition.

FIGS. 9A-9D illustrate a process for manufacturing a heat exchange element using a plastic corrugated cardboard according to an embodiment of the present invention. FIG. 10 illustrates a multi/single-flow-path heat exchanger manufactured through the process of FIGS. 9A-9D.

Figure 9:
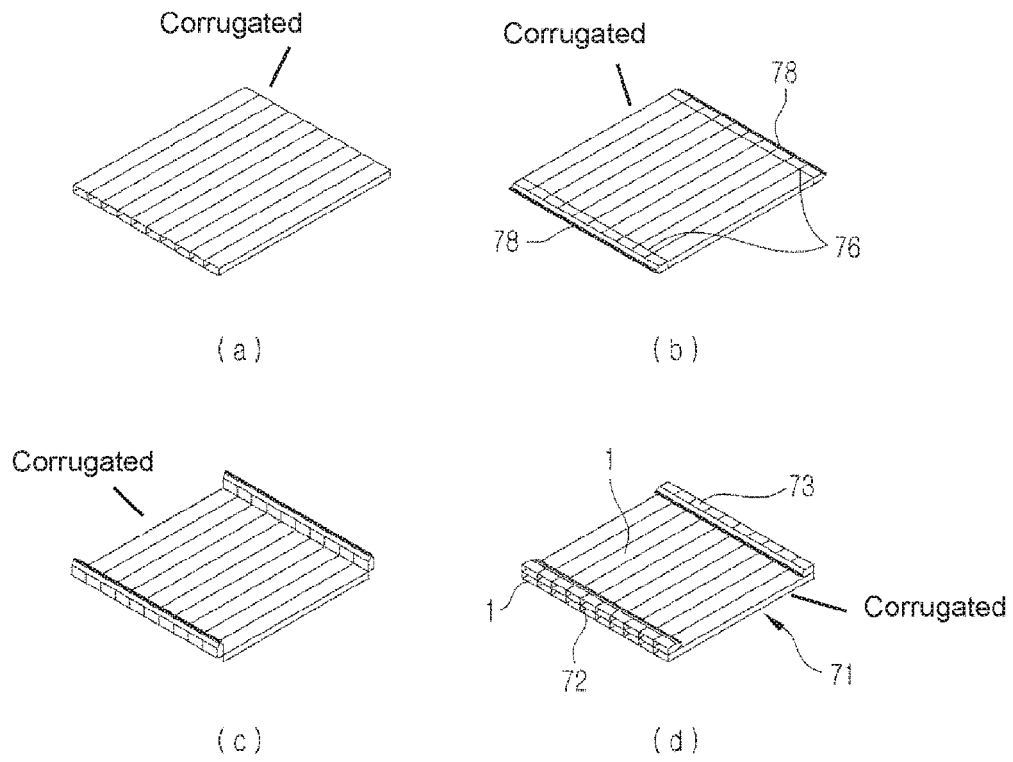
FIGS. 9A-9D and 10 illustrate a process for manufacturing a heat exchange element used in a heat exchanger according to a first embodiment of the present invention and the heat exchanger manufactured through the manufactured process.

FIG. 9A illustrates a plastic corrugated cardboard which has a multi-flow-path formed through extrusion molding. Referring to FIG. 9B, both ends of the multi-flow-path in the plastic corrugated cardboard illustrated in FIG. 9A are completely sealed through thermal bonding, and the plastic corrugated cardboard is cut along a cutting line 76 which is formed on the bottom surface thereof at a predetermined distance from either thermal bonding line 78, in a direction perpendicular to the multi-flow-path. The predetermined distance corresponds to ½ of the thickness of the corrugated cardboard. Referring to FIG. 9C, both ends of the plastic corrugated cardboard, which are sealed through thermal bonding, are bent by 90 degrees along the cutting line 76. Referring to FIG. 9D, both ends of the plastic corrugated cardboard are bent by 180 degrees so as to form spacer members 73 of the heat exchange element. Thus, the heat exchange element 71 includes two heat exchange surfaces 1, a heat exchange surface spacer member 72, and the heat exchange element spacer members 73.

The thermal bonding is one of processes for closing both ends, and another closing process may be applied.

FIG. 10 illustrates a heat exchanger 70 including a plurality of heat exchange elements 71, two insulation support plates 74, and fourth connection members 75, which form a multi-flow-path structure and a single-flow-path structure. The plurality of heat exchange elements 71 are manufactured through the process described with reference to FIGS. 9A-9D and then stacked. The multi-flow-path structure formed through the heat exchange surface spacer members 72 is used as a flow path for supplied air stream 22-23, and the single-flow-path structure formed through the heat exchanger spacer members 73 is used as a flow path for exhaust air stream 32-33. In this case, the use of the two flow paths may be changed in a place where foreign matters such as ice or dust are not accumulated.

In the heat exchanger of FIG. 10, the heat exchanger spacer member 73 for forming the single-flow-path structure is formed by thermally bonding and bending a plastic corrugated cardboard. In a heat exchanger of FIG. 12, however, a heat exchange element spacer member 83 is formed using another material such as foamed plastic. FIGS. 11A-11B illustrate a process for manufacturing a heat exchange element of the heat exchanger of FIG. 12.

Referring to FIGS. 11A-11B, the heat exchange element spacer member 83 is attached at both ends of a plastic corrugated cardboard 87, thereby forming a heat exchange element 81 which includes two heat exchange surfaces 1, a heat exchange surface spacer member 82, and the heat exchange element spacer member 83.

FIG. 12 illustrates the heat exchanger 80 including a plurality of heat exchange elements, two insulation support plates 84, and four connection members 85, which form a multi-flow-path structure and a single-flow-path structure. The plurality of heat exchange elements are manufactured through the process described with reference to FIGS. 11A-11B, and then stacked. The multi-flow-path structure formed through the heat exchange surface spacer members 82 is used as a flow path for supplied air stream 22-23, and the single-flow-path structure formed through the heat exchange element spacer members 83 is used as a flow path for exhaust air stream 32-33. In this case, the use of the two flow paths may be changed in a place where foreign matters such as ice or dust are not accumulated.

The heat exchangers of FIGS. 10 and 12 include the single-flow-path structure serving as the flow path for the exhaust air stream, and have no spacer protrusions formed in the flow path. Thus, the heat exchangers may compensate the defects of the multi-flow-path heat exchanger 40 or 60 vulnerable to ice formation or the single-flow-path heat exchanger 50 vulnerable to dust. Furthermore, low-priced extrusion-molded plastic corrugated cardboards may be used to simply manufacture the heat exchangers 70 and 80 without applying an adhesive on the heat exchange surfaces 1.

Figure 13:
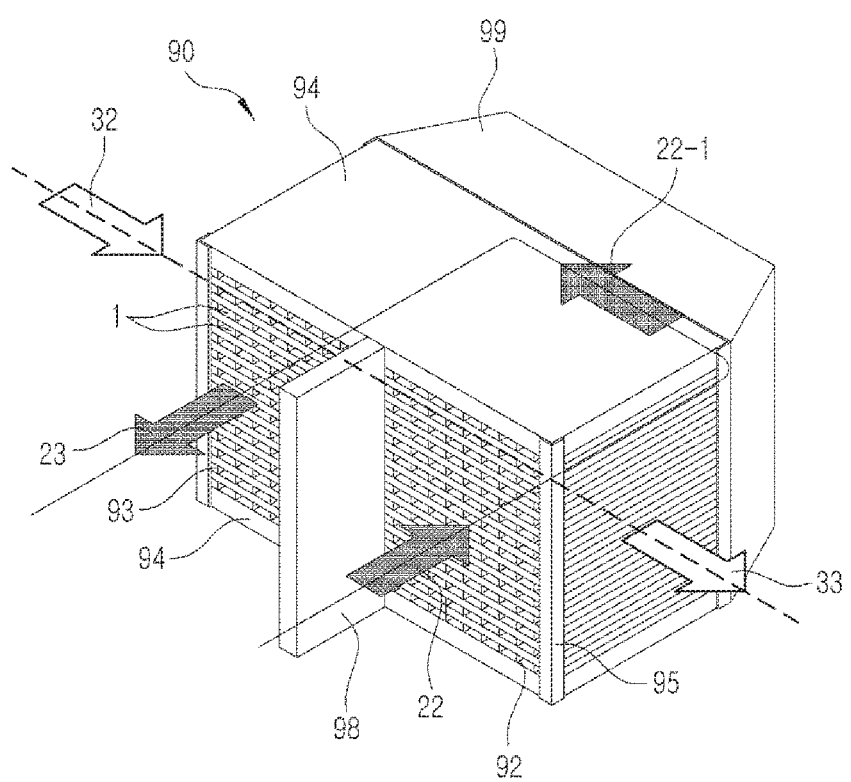
FIG. 13 schematically illustrates a double heat exchanger according to a third embodiment of the present invention, including a partition wall and an intermediate chamber formed therein.

The heat exchangers 70 and 80 according to the embodiment of the present invention have considerably compensated the defects of the existing heat exchangers 40, 50, and 60, but the outdoor air temperature at which ice formation begins to occur is equal to that of the existing heat exchangers 40, 50, and 60. FIG. 13 illustrates a double heat exchanger 90 which includes a partition wall 98 and a supplied-air-stream intermediate chamber 99 which are additionally installed in the heat exchanger 70 or 80 according to the embodiment of the present invention. The partition wall 98 is installed on one surface of a multi-flow-path structure, and the supplied-air-stream intermediate chamber 99 is installed on the other surface of the multi-flow-path structure. Outdoor air 22 receives energy from exhaust air stream through heat exchange surfaces 1 while passing through the multi-flow-path structure formed through heat exchange surface spacer members 92, and then becomes supplied air stream. The supplied air stream is introduced into the supplied-air-stream intermediate chamber 99, and receives energy from the exhaust air stream through the heat exchange surfaces while passing through the multi-flow-path structure. Then, the supplied air stream becomes supplied air 23 to be supplied to the interior. Return air 32 transmits energy to the supplied air stream through the heat exchange surfaces 1 while passing through a single-flow-path structure formed through heat exchanger spacer members 93, and becomes exhaust air to be discharged to the exterior. Two heat exchange element support plates 94 and four connection members 95 serve to fix the stacked heat exchange elements 91, and the partition wall 98 serves to prevent the mixing of the outdoor air 22 and the supplied air 23.

Table 3 comparatively shows ice formation areas of the multi-flow-path heat exchanger 40 or 60 and the double heat exchanger 90 having the same heat exchange efficiency as the high-efficiency heat exchangers 40, 50, and 60 shown in Table 1, depending on outdoor temperatures. The return air has a temperature of 26° C. and a relative humidity of 60%.

TABLE 3

| Outdoor air temperature (° C.) | Multi-flow-path heat exchanger | | | Double heat exchanger | | |
|---|---|---|---|---|---|---|
| | Ice formation area (%) | Ice formation width (%) | Available heat exchange area | Ice formation area (%) | Ice formation width (%) | Available heat exchange area |
| −2 | 0.0 | 0.0 | 100.0 | 0.0 | 0.0 | 100.0 |
| −4 | 0.2 | 3.0 | 97.0 | 0.0 | 0.0 | 100.0 |
| −6 | 1.8 | 10.0 | 90.0 | 0.0 | 0.0 | 100.0 |
| −8 | 3.5 | 15.5 | 84.5 | 0.0 | 0.0 | 100.0 |
| −10 | 7.0 | 22.5 | 77.5 | 0.3 | 7.0 | 99.7 |
| −12 | 9.9 | 28.0 | 72.0 | 1.7 | 17.5 | 98.3 |

In the double heat exchanger 90 according to the embodiment of the preset invention, the outdoor air temperature at which ice formation occurs is lower by 5 to 6° C. than in the multi-flow-path heat exchanger 40 or 60 and the single-flow-path heat exchanger 50. Furthermore, the available heat exchange area ratio is determined by the ice formation area ratio instead of the ice formation width ratio, like the single-flow-path heat exchanger.

Descriptions for Defrosting Operation of Heat Recovery Ventilator

Figure 14:
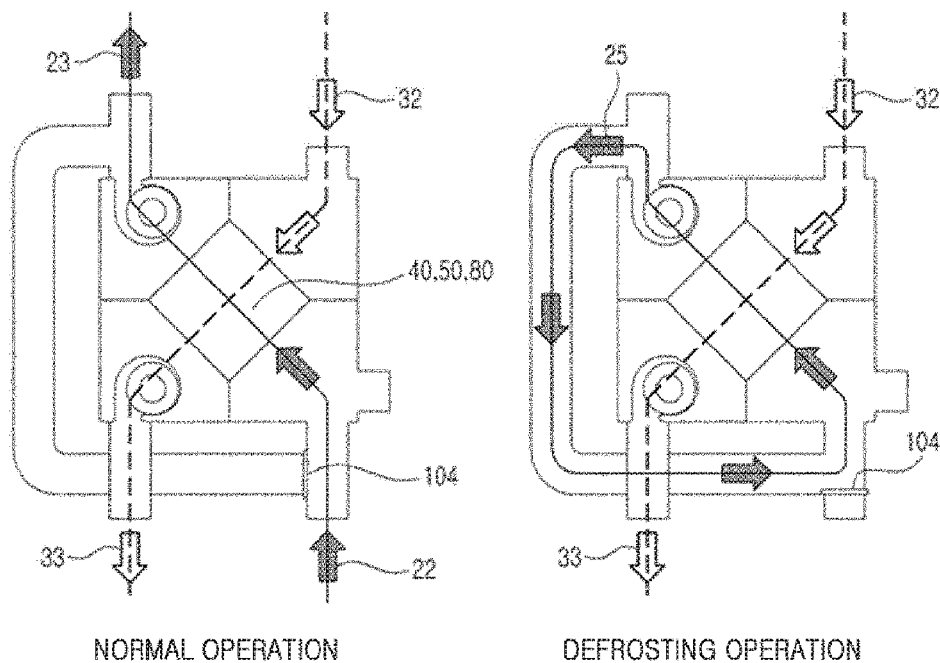
FIG. 14 illustrates a heat exchanger for explaining a method for defrosting operation according to a first embodiment of the present invention, including a flow path selection damper and a connection path for connecting an outdoor air introduction chamber and a supplied air discharge chamber.
Figure 15:
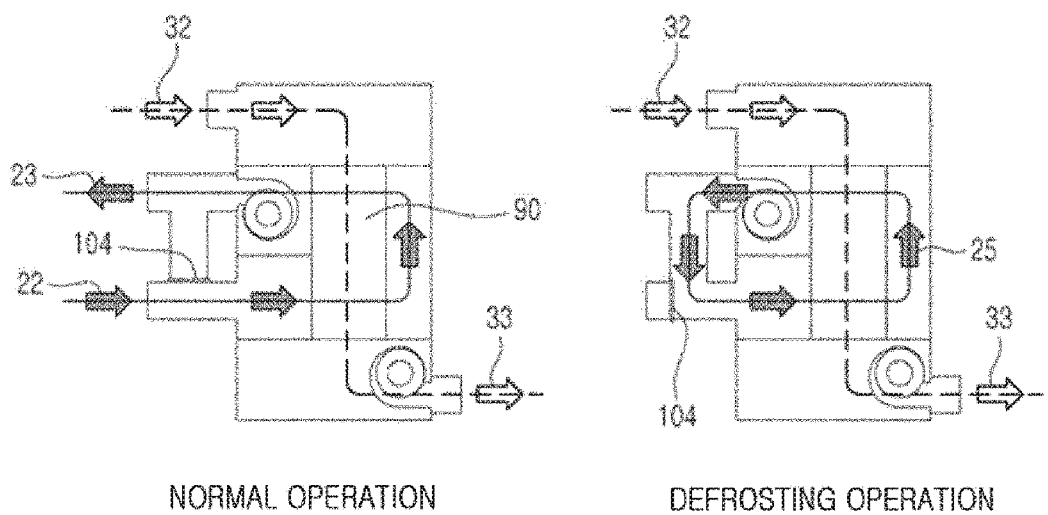
FIG. 15 illustrates an example in which the defrosting operation of FIG. 14 is applied to the double heat exchanger of FIG. 13.
Figure 16:
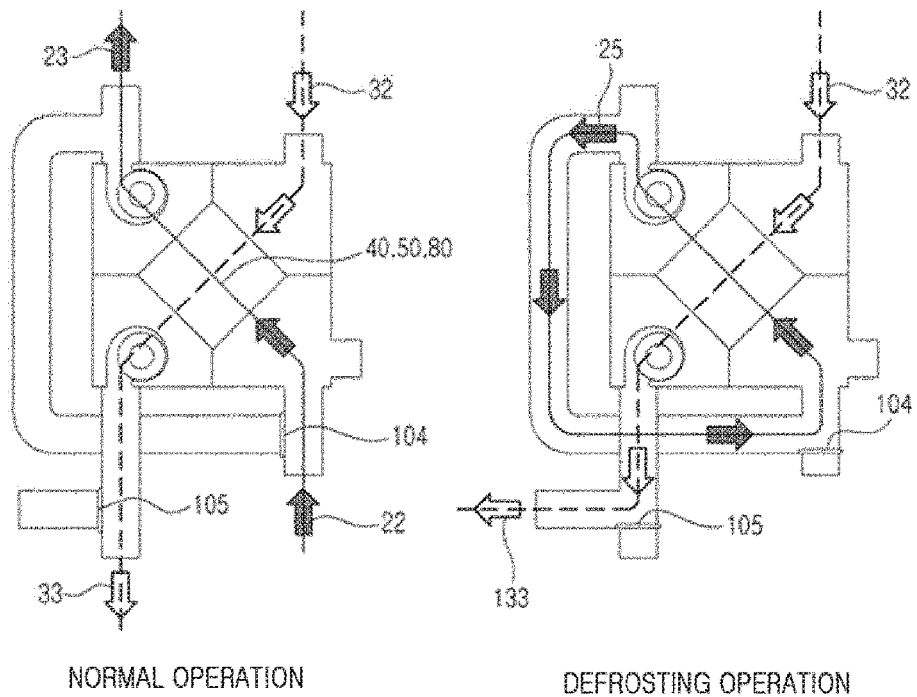
FIG. 16 illustrates a heat exchanger for explaining a method for defrosting operation according to a first embodiment of the present invention, including another flow path selection damper and another connection path for connecting the interior and the exterior.
Figure 17:
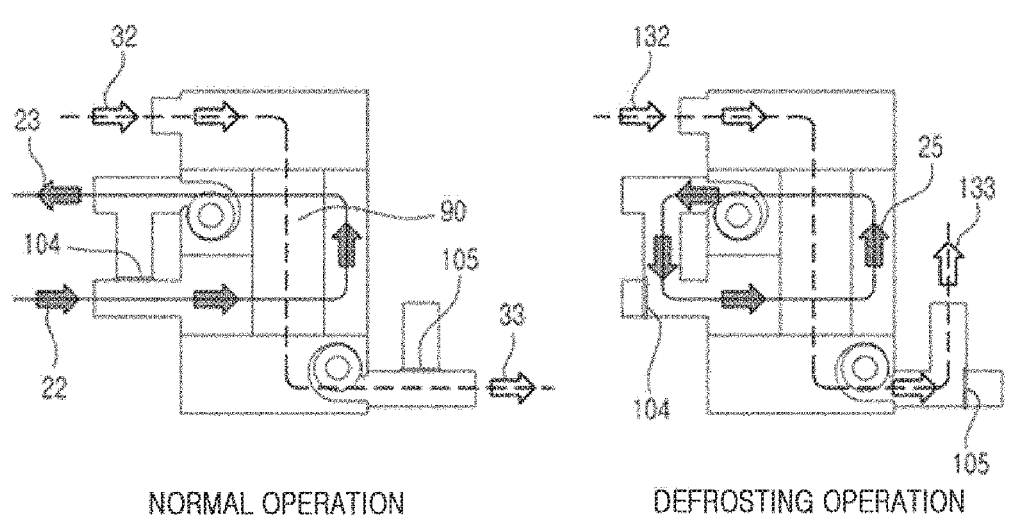
FIG. 17 illustrates an example in which the defrosting operation of FIG. 16 is applied to the double heat exchanger of FIG. 13.

Referring to FIGS. 14 and 15, a defrosting operation according to a first embodiment of the present invention will be described. Referring to FIGS. 16 and 17, a defrosting operation according to a second embodiment of the present invention will be described.

The embodiments of the present invention provide a new method for a defrosting operation for removing ice formation which occurs in a flow path for exhaust air stream of a heat exchanger or blockage of a flow path for supplied air stream, which is caused by snow.

FIG. 14 illustrates an example in which a flow path selection damp 104 (first flow path selection damper) and a connection path (first connection path) for connecting an exhaust air inlet (that is, outdoor air introduction chamber) and a supplied air outlet (that is, supplied air discharge chamber) are installed. When a defrosting operation is required to remove ice formed in a flow path for exhaust air stream or blockage of a flow path for supplied air stream, caused by snow, in the heat exchanger, the flow path selection damper 104 blocks the introduction of outdoor air, and connects the supplied air outlet and the outdoor air inlet. In the flow path for the exhaust air stream, return air 32 is passed through the return air introduction chamber and the heat exchanger 40, 50, or 80, and then discharged as exhaust air 33 to the exterior. In the flow path for the supplied air stream, internal air 25 is circulated through the supplied air discharge chamber, the connection member, the outdoor air introduction chamber, and the supplied air flow path of the heat exchanger 40, 50, or 80. In a section corresponding to the ice formation area, the temperature of the circulated air 25 decreases while the circulated air 25 melts ice formed in the exhaust air flow path through the heat exchange surface. In a section where heat exchange may be performed, the temperature of the circulated air 25 increases while the circulate air 25 receives energy from the exhaust air stream. The exhaust air stream 32-33 supplies energy to the circulated air and partially contributes to the frosting operation, while passing through the exhaust air flow path of the heat exchanger. Then, the exhaust air stream 32-33 is discharged as exhaust air to the exterior. The blockage caused by snow in the outdoor air introduction part of the heat exchanger may be removed through the same method.

The heat exchanger used at this time may include the multi-flow-path heat exchangers 40 and 60, the single-flow-path heat exchanger 50, and the multi/single-flow-path heat exchanger illustrated in FIGS. 9A-9D, 10, 11A-11B, 12 and 13.

FIG. 15 illustrates a heat recovery ventilator which performs a defrosting operation using the double heat exchanger 90 according to the third embodiment of the present invention (refer to FIG. 13). The heat recovery ventilator performs a defrosting operation in the same method as illustrated in FIG. 14.

Figure 1:
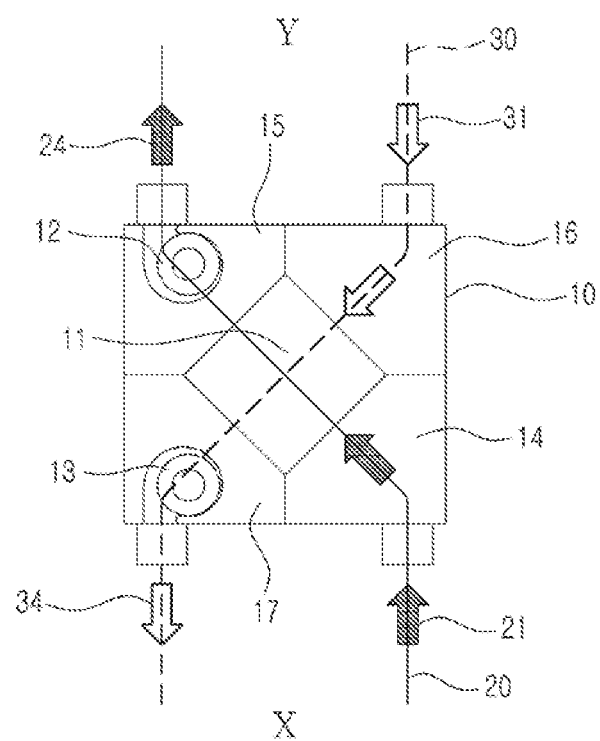
FIG. 1 schematically illustrates a general heat recovery ventilator.
Figure 2:
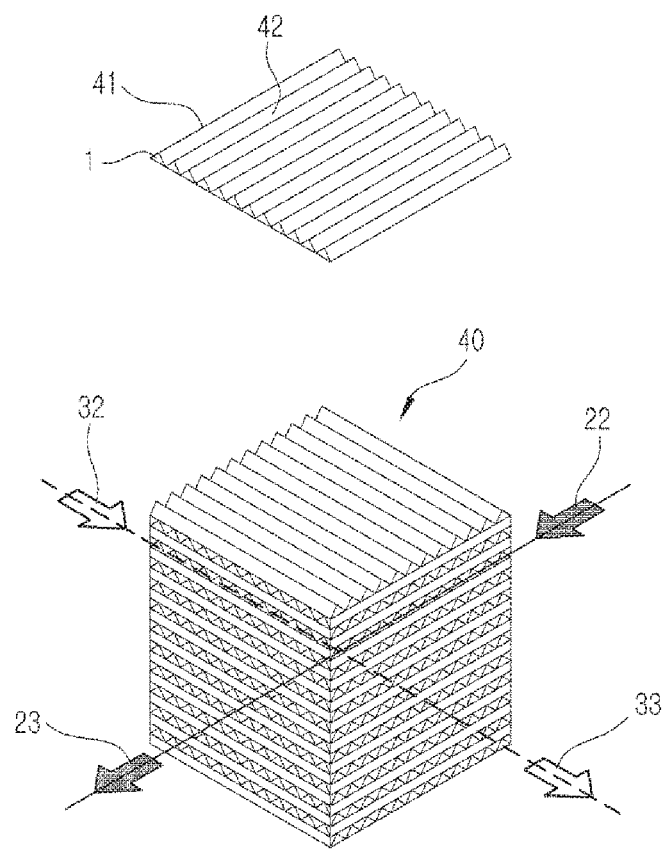
FIGS. 2, 3 and 4 schematically illustrate conventional heat exchangers.
Figure 3:
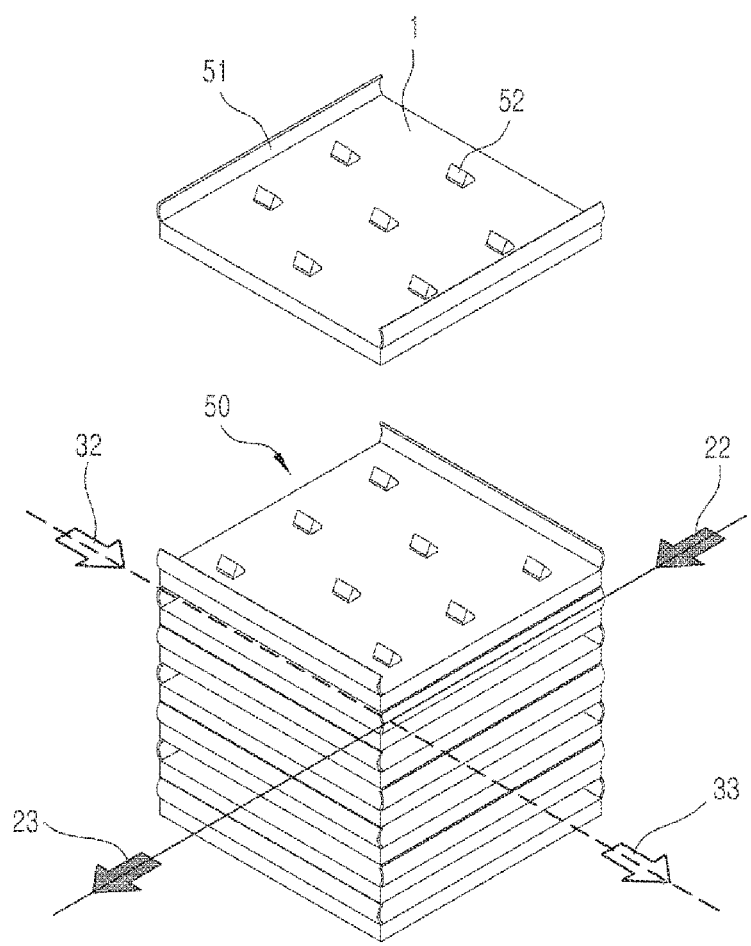
Figure 4:
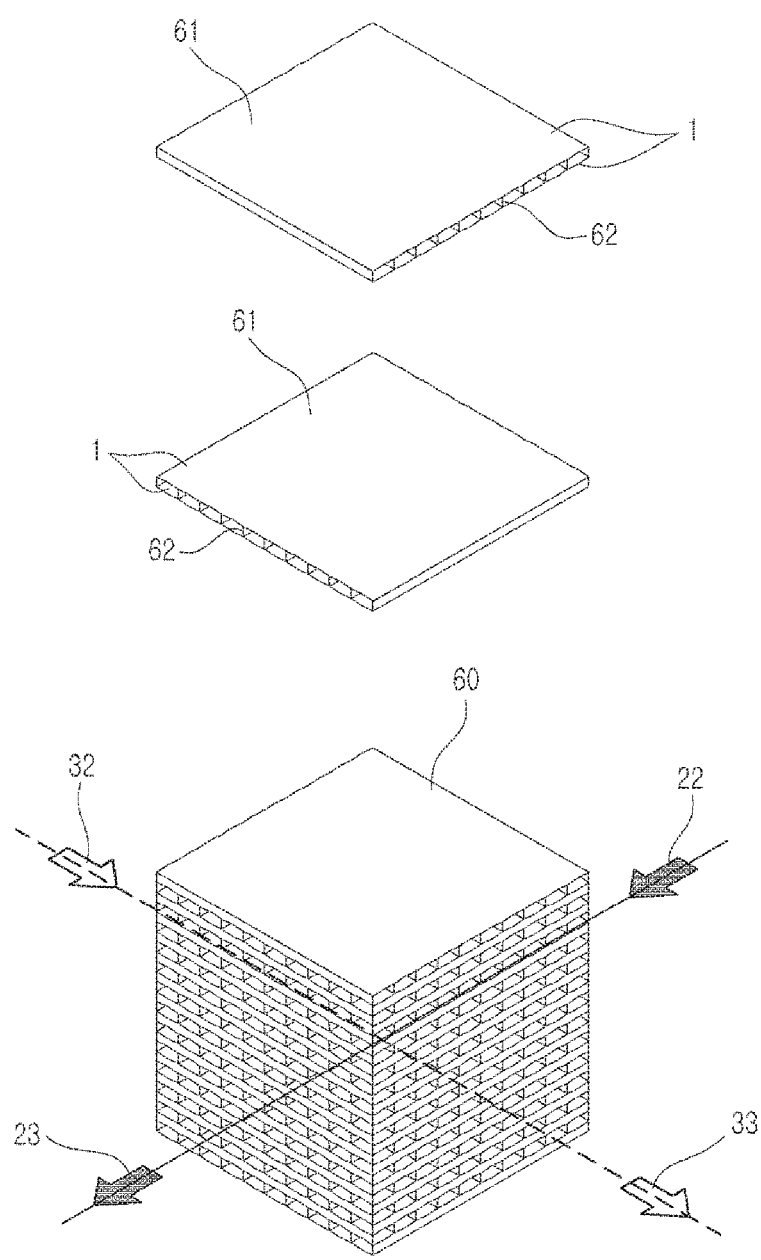
Figure 5:
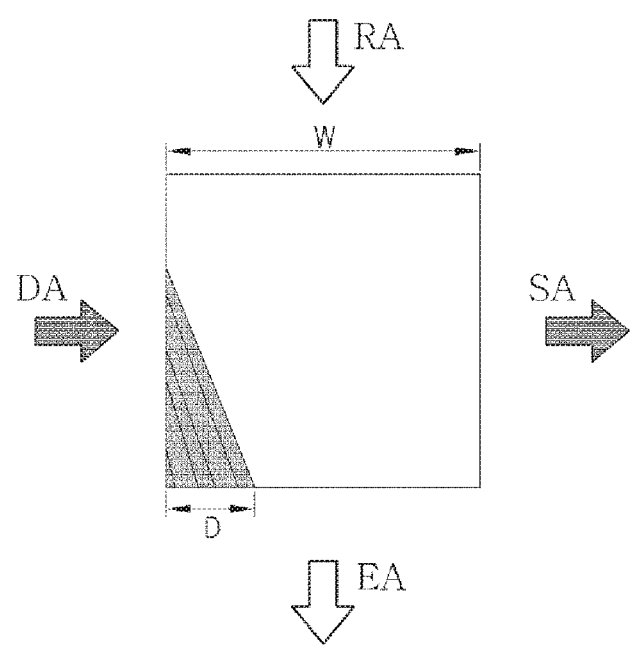
FIG. 5 is a plan view for explaining the shape of ice formed in the heat exchanger.
Figure 6:
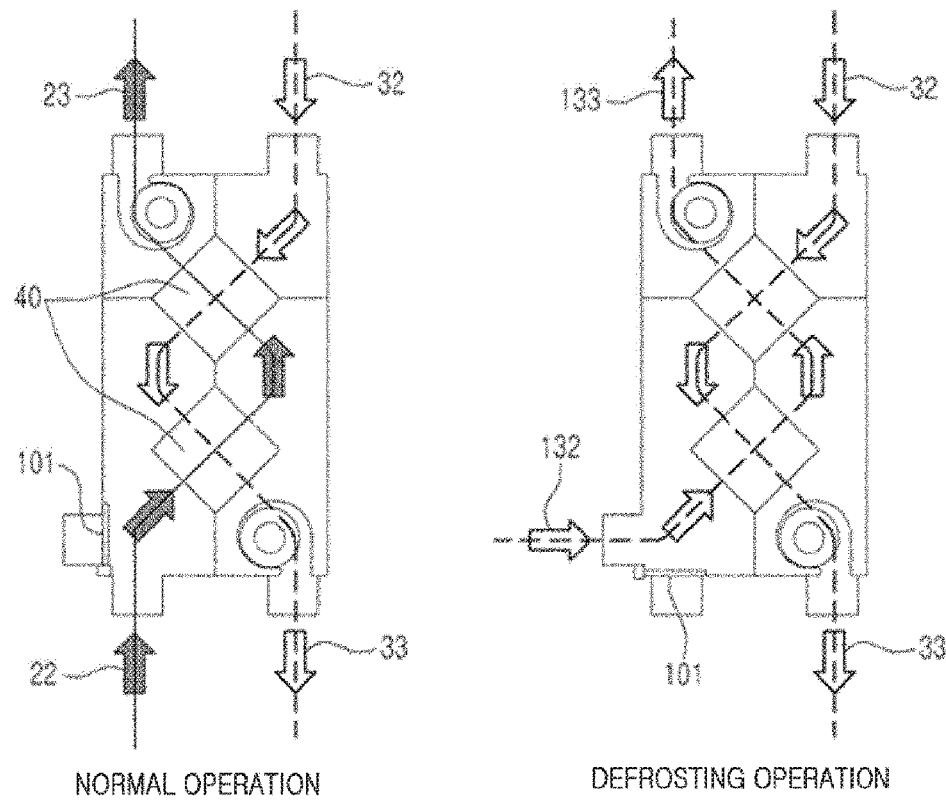
FIGS. 6, 7 and 8 schematically illustrate a defrosting operation of the conventional heat recovery ventilator.
Figure 7:
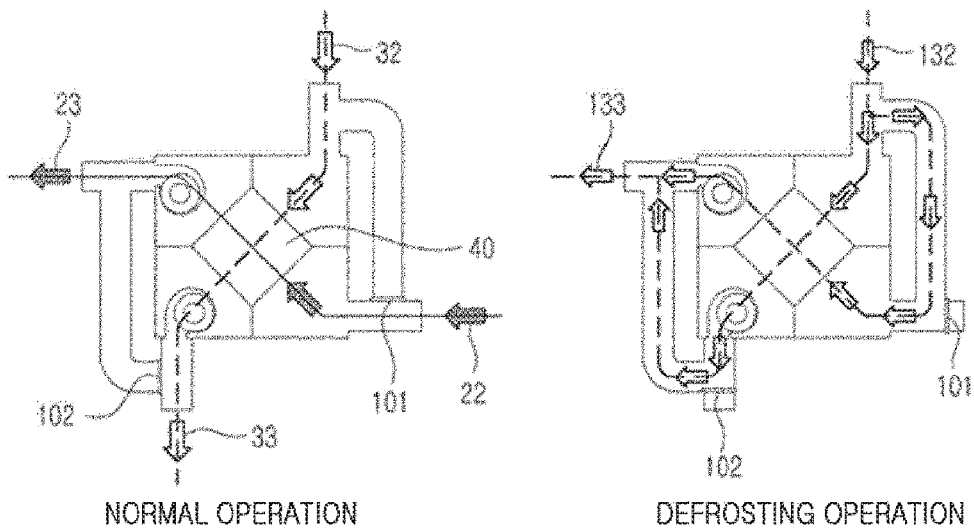
Figure 8:
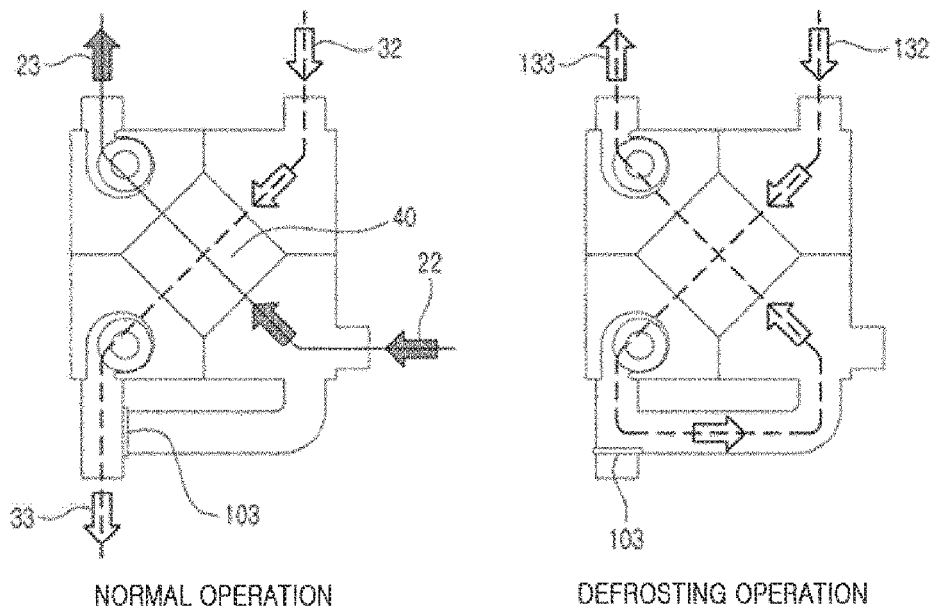

The defrosting method of FIGS. 14 and 15 is a negative pressure-type defrosting method which does not supply outdoor air to the interior but discharge outdoor air to the exterior during a defrosting operation. Thus, although the ventilation efficiency is not degraded like the method of FIG. 6, a problem may occur when the defrosting method is used in a place where outdoor air is introduced into the interior through a contaminated path such as an outlet of a kitchen hood.

FIG. 16 illustrates that a connection path (second connection path) for connecting the exhaust air outlet (that is, exhaust air discharge chamber) to the interior is installed and a flow path selection damper 105 (second flow path selection damper) are installed in order to compensate the problem of the defrosting method illustrated in FIG. 14. The defrosting operation of FIG. 16 is different from that of FIG. 14 in that exhaust air is not discharged to the exterior but reintroduced to the interior by the flow path selection damper 105. That is, the return air 132 becomes reintroduced air 133 which is reintroduced to the interior through the return air introduction chamber, the heat exchanger exhaust air flow path, and the exhaust air discharge chamber. The circulated air 25 melts ice while internally circulated in the same method as illustrated in FIG. 14. In this method, ventilation is stopped during the defrosting operation. Thus, this method may be effectively used in a place where ventilation efficiency does not matter.

The heat exchanger used at this time may include the multi-flow-path heat exchangers 40 and 60, the single-flow-path heat exchanger 50, and the multi/single-flow-path heat exchanger illustrated in FIGS. 9A-9D, 10, 11A-11B, 12 and 13.

FIG. 17 illustrates a heat recovery ventilator which performs a defrosting operation in the same manner as illustrated in FIG. 16, using the double heat exchanger 90 according to the third embodiment of the present invention (refer to FIG. 13).

Method for Defrosting Operation, Normal Operation, and Checking Operation

Figure 18:
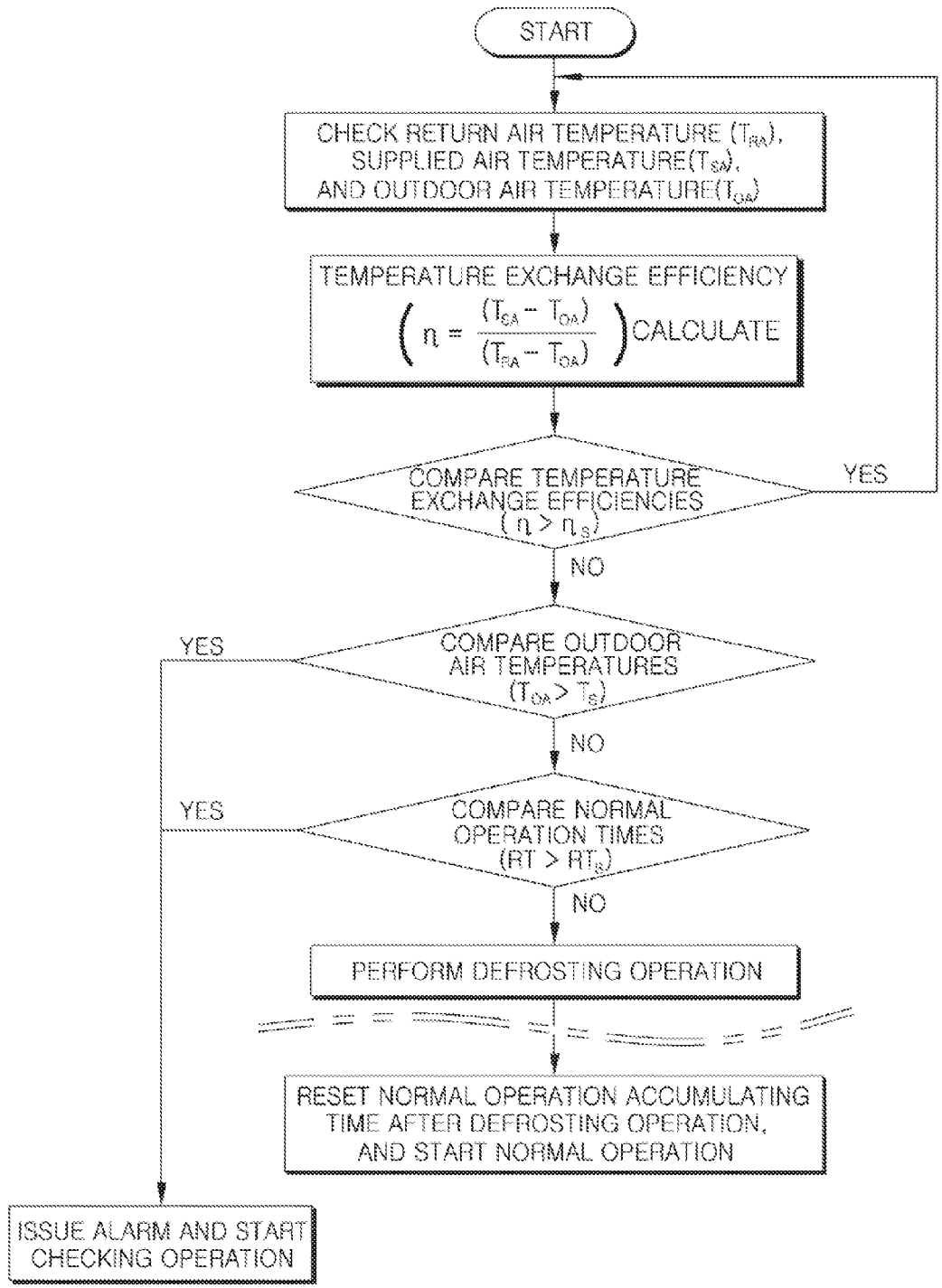
FIGS. 18, 19 and 20 are flowcharts illustrating three embodiments of a method for defrosting operation, normal operation, and checking operation of a heat recovery ventilator.
Figure 19:
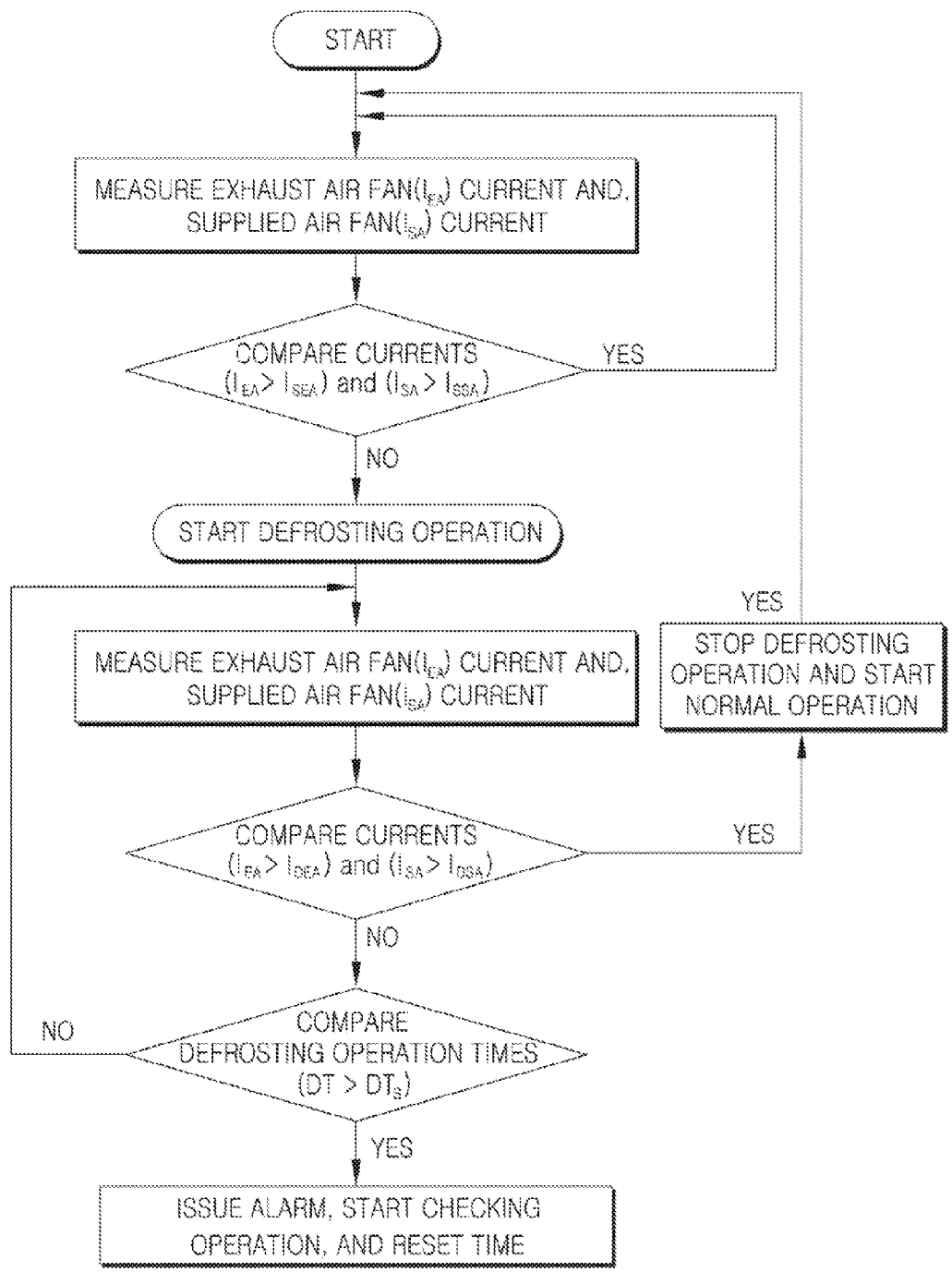
Figure 20:
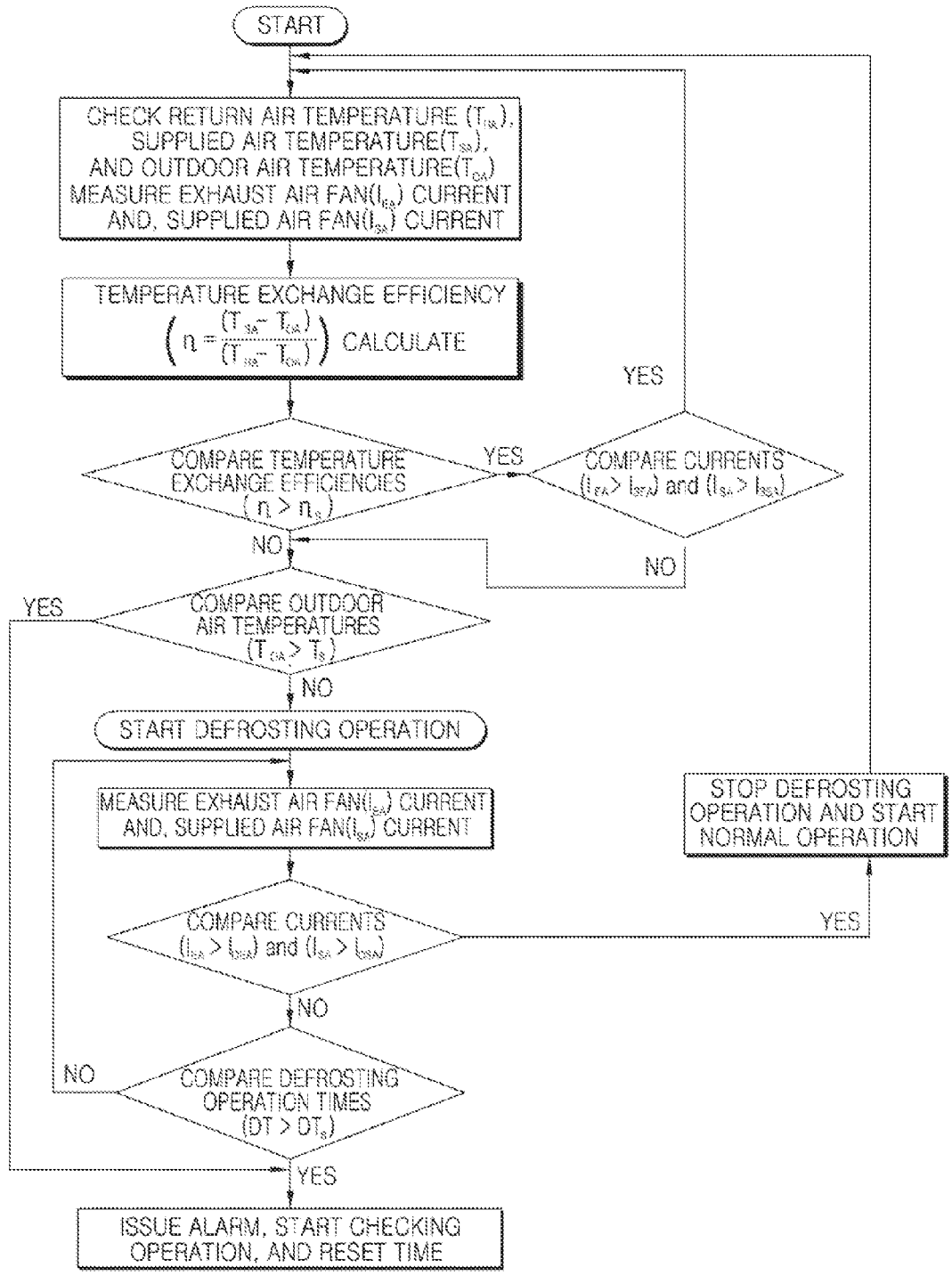

Referring to FIGS. 18 to 20, three embodiments of a method for a defrosting operation, a normal operation, and a checking operation will be described.

The embodiments of the present invention provide a method in which a heat recovery ventilator detects flow path blockage when the flow paths for supplied air stream and exhaust air stream are clogged with dust or ice, issues an alarm, and performs a defrosting operation and a normal operation.

When the flow path for supplied air stream or exhaust air stream in the heat exchanger is clogged with ice or dust, the resistance of the air stream is increased to reduce the amount of air passing through the corresponding flow path, and an available heat exchange area is reduced. Table 4 shows the influence of flow path blockage on temperature exchange efficiency, heat exchange efficiency, and ventilation efficiency.

TABLE 4

| | Flow path blockage | | Temperature exchange efficiency | Heat exchange efficiency | Ventilation efficiency | Flow path resistance | |
|---|---|---|---|---|---|---|---|
| | Supplied air | Exhaust air | | | | Supply | Exhaust |
| 1 | normal | blocked | decrease | decrease | normal | normal | increase |
| 2 | blocked | normal | increase | decrease | slight decrease | increase | normal |
| 3 | blocked | normal | unknown | decrease | decrease | increase | increase |

Here, the heat exchange efficiency $\epsilon$ may be expressed through the density $\rho_{OA}$ of outdoor air, the air amount $Q_{OA}$, the density $\rho_{RA}$ of return air, the return air temperature $T_{RA}$, the supplied air temperature $T_{SA}$, and the outdoor air temperature $T_{OA}$, and the temperature exchange efficiency $\eta$ may be simply expressed through the return air temperature $T_{RA}$, the supplied air temperature $T_{SA}$, and the outdoor air temperature $T_{OA}$, without the supplied air amount and the exhaust air amount.

$$\epsilon = \frac{\rho_{OA} Q_{OA}(T_{SA} - T_{OA})}{C_{MAX}(T_{RA} - T_{OA})}, \quad \text{Equation 1}$$

$$C_{MAX} = \text{Max}(\rho_{OA} Q_{OA}, \rho_{RA} Q_{RA})$$

$$\eta = \frac{T_{SA} - T_{OA}}{T_{RA} - T_{OA}} \quad \text{Equation 2}$$

As shown in Table 4, when the flow path for the supplied air stream or exhaust air stream is blocked, the heat exchange efficiency decreases in all cases, but the temperature exchange efficiency differs depending on cases.

In the method according to the first embodiment of the present invention, three temperature sensors are used to perform a defrosting operation, a normal operation, and a checking operation as illustrated in FIG. 18.

FIG. 18 illustrates a method in which a return air temperature sensor, an outdoor air temperature sensor, and a supplied air temperature sensor are installed in the return air introduction chamber, the outdoor air introduction chamber, and the supplied air discharge chamber, respectively, and a defrosting operation, a normal operation, and a checking operation are performed on the basis of a result obtained by calculating the temperature exchange efficiency $\eta$ using temperatures detected through the respective temperature sensors in a normal operation state.

When the temperature exchange efficiency $\eta$ becomes equal to or less than reference efficiency $\eta_S$, the heat recovery ventilator determines that flow path blockage occurred in the exhaust air stream. When the temperature exchange efficiency $\eta$ is lower than reference efficiency $\eta_S$ and when the outdoor temperature $T_{OA}$ is higher than ice formation reference temperature $T_S$ or a normal operation accumulating time RT is smaller than a reference time $RT_S$, the heat recovery ventilator determines that flow path blockage occurred due to accumulated dust, issues an alarm, and performs a checking operation. The normal operation accumulating time RT indicates an accumulating time during which the normal operation is continuously performed without a defrosting operation.

When the temperature exchange efficiency $\eta$ is lower than reference efficiency $\eta_s$ and when the outdoor temperature $T_{OA}$ is lower than the ice formation reference temperature $T_S$ and the normal operation accumulating time RT is larger than the reference time $RT_S$, the heat recovery ventilator determines that flow path blockage occurred due to ice formation, and starts a defrosting operation. After performing the defrosting operation for a preset time or more, the heat recovery ventilator resets the normal operation accumulating time RT, and then starts a normal operation.

This method may be effectively used to determine whether the exhaust air flow path is normal or not when the supplied air flow path is normal, and performed at a low cost. However, this method cannot be used to determine whether the supplied air flow path is normal or not, and the defrosting operation time must be fixed because the defrosted state of the heat exchanger cannot be recognized during the defrosting operation.

FIG. 19 illustrates a method in which two hole sensors capable of measuring a current flowing through an electric wire are used to perform a defrosting operation, a normal operation, and a checking operation.

As shown in Table 4, when an air flow path is blocked, the resistance of the flow path is increased, and the amount of air flowing in the flow path is decreased. When the resistance of the flow path is increased, the amount of air transferred through a fan used in the heat recovery ventilator is decreased, and the rpm of the fan is increased. Then, the power consumption of the fan is reduced, and the amount of current supplied to the fan motor is reduced. That is, since the current amount of the fan is decreased in inverse proportion to the increase of the flow path resistance. Such a correlation constantly appears while the fan is used. Thus, when a hole sensor for measuring a current is installed in an electric wire for supplying power to the fan, the current may be measured to determine how much the flow path is blocked.

FIG. 19 is a flow chart illustrating the method in which the heat recovery ventilator performs a defrosting operation, a normal operation, and a checking operation using two hole sensors installed in a supplied air fan and an exhaust air fan, respectively.

When an exhaust air fan current $I_{EA}$ and a supplied air fan current $I_{SA}$ are larger than a normal operation exhaust air fan reference current $I_{SEA}$ and a normal operation supplied air fan reference current $I_{SSA}$, the heat recovery ventilator performs a normal operation. When the exhaust air fan current $I_{EA}$ and the supplied air fan current $I_{SA}$ are smaller than the exhaust air fan reference current $I_{SEA}$ and the normal operation fan reference current $I_{SSA}$, the heat recovery ventilator performs a defrosting operation. When the currents $I_{EA}$ and $I_{SA}$ are larger than a defrosting operation exhaust air fan reference current $I_{DEA}$ and a defrosting operation supplied air fan reference current $I_{DSA}$, the heat recovery ventilator stops the defrosting operation, and returns to the normal operation. When the currents $I_{EA}$ and $I_{SA}$ are smaller than the reference currents $I_{DEA}$ and $I_{DSA}$ even though a defrosting operation time DT exceeds a time limit $DT_S$, the heat recovery ventilator stops the defrosting operation, issues an alarm, and performs a checking operation.

FIG. 20 illustrates a method in which the heat recovery ventilator performs a defrosting operation, a normal operation, and a checking operation using three temperature sensors and two hole sensors capable of measuring a current flowing through an electric wire.

FIG. 20 illustrates a method in which the methods of FIGS. 18 and 19 are combined. According to the method, the heat recovery ventilator performs a defrosting operation, a normal operation, and a checking operation using a return air temperature sensor, an outdoor air temperature sensor, and a supplied air temperature sensor, which are installed in the return air introduction chamber, the outdoor air introduction chamber, and the supplied air discharge chamber, respectively, and the two hole sensors installed in the supplied air fan and the exhaust air fan, respectively.

When the temperature exchange efficiency η is higher than the reference efficiency $η_S$ in a normal operation state and when the exhaust air fan current $I_{EA}$ and the supplied air fan current $I_{SA}$ are larger than the normal operation exhaust air fan reference current $I_{SEA}$ and the normal operation supplied air fan reference current $I_{SSA}$, the heat recovery ventilator performs a normal operation. Otherwise, the heat recovery ventilator performs a defrosting operation or checking operation. When the operation state deviates from the normal operation condition and the outdoor air temperature $T_{OA}$ is lower than the ice formation reference temperature $T_S$, the heat recovery ventilator performs a defrosting operation. When the outdoor air temperature $T_{OA}$ is higher than the ice formation reference temperature $T_S$, the heat recovery ventilator issues an alarm, and starts a checking operation.

When the currents $I_{EA}$ and $I_{SA}$ are larger than the defrosting operation exhaust air fan reference current $I_{DEA}$ and the defrosting operation supplied air fan reference current $I_{DSA}$ during the defrosting operation, the heat recovery ventilator stops the defrosting operation, and returns to the normal operation. When the currents $I_{EA}$ and $I_{SA}$ are smaller than the reference currents $I_{DEA}$ and $I_{DSA}$ even through the defrosting operation time DT exceeds the time limit $DT_S$, the heat recovery ventilator stops the defrosting operation, issues an alarm, and performs a checking operation.

While the present invention has been described with respect to the specific embodiments, it will be apparent to those skilled in the art that various changes and modifications may be made without departing from the spirit and scope of the invention as defined in the following claims.

What is claimed is:

1. A heat exchanger comprising:
a plurality of stacked heat exchange elements;
support plates attached to the top and bottom surfaces of said stacked heat exchange elements; and
connection members attached to the respective corners of said stacked heat exchange elements,
wherein each of said heat exchange elements comprises:
a heat exchange surface spacer member having a plurality of first flow paths arranged in parallel to each other; and
a pair of heat exchange element spacer members attached to the upper surface of the heat exchange surface spacer member so as to be spaced apart from each other,
a second flow path is formed between the pair of heat exchange element spacer members along a direction perpendicular to the first flow paths,
wherein the plurality of heat exchange elements are formed of corrugated cardboard, and the plurality of first flow paths are formed by the corrugations of the corrugated cardboard,
wherein each of heat exchange element spacer members is formed by closing both ends of the corrugated cardboard and bending both ends of the corrugated cardboard along cutting lines spaced from the respective closed ends and positioned perpendicular to the flow direction of the plurality of first flow paths.

2. The heat exchanger according to claim 1, wherein said heat exchanger further comprises:
a partition wall installed on one outside of said plurality of heat exchange elements in a direction perpendicular to the direction where said plurality of heat exchange elements are stacked, at one end of the flow direction of said plurality of first flow paths; and
an intermediate chamber which is installed on another exterior side of said plurality of heat exchange elements so as to face said partition wall and through which said plurality of first flow paths communicate.

\* \* \* \* \*